United States Patent
Wang et al.

(10) Patent No.: US 11,825,040 B2
(45) Date of Patent: Nov. 21, 2023

(54) IMAGE SHOOTING METHOD AND DEVICE, TERMINAL, AND STORAGE MEDIUM

(71) Applicant: BEIJING XIAOMI MOBILE SOFTWARE CO., LTD., Beijing (CN)

(72) Inventors: Qian Wang, Beijing (CN); Yu Zhao, Beijing (CN); Guiqi Cui, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 159 days.

(21) Appl. No.: 16/870,215

(22) Filed: May 8, 2020

(65) Prior Publication Data
US 2021/0176392 A1    Jun. 10, 2021

(30) Foreign Application Priority Data
Dec. 5, 2019    (CN) .......................... 201911236108.X

(51) Int. Cl.
| | | |
|---|---|---|
| H04N 1/00 | (2006.01) | |
| G06F 9/54 | (2006.01) | |
| H04N 23/61 | (2023.01) | |
| H04N 23/63 | (2023.01) | |

(52) U.S. Cl.
CPC ......... H04N 1/00307 (2013.01); G06F 9/542 (2013.01); H04N 23/61 (2023.01); H04N 23/632 (2023.01)

(58) Field of Classification Search
CPC ........... H04N 5/23222; H04N 1/00244; H04N 5/23212; H04N 5/232945; G06Q 50/265
USPC ............................ 348/230.2; 358/1.2; 706/14
See application file for complete search history.

(56) References Cited

U.S. PATENT DOCUMENTS

| | | | |
|---|---|---|---|
| 9,578,195 B1* | 2/2017 | Pashintsev | ........... H04N 1/2133 |
| 2005/0088542 A1* | 4/2005 | Stavely | .................... G06T 11/60 |
| | | | 348/E5.042 |
| 2009/0066803 A1 | 3/2009 | Miyata | |
| 2010/0245597 A1 | 9/2010 | Pai et al. | |
| 2011/0050915 A1 | 3/2011 | Wang et al. | |
| 2011/0228129 A1 | 9/2011 | Miyata | |
| 2012/0069210 A1 | 3/2012 | Miyata | |

(Continued)

FOREIGN PATENT DOCUMENTS

| | | |
|---|---|---|
| CN | 103945114 A | 7/2014 |
| CN | 106023083 A | 10/2016 |

(Continued)

OTHER PUBLICATIONS

Supplementary European Search Report in the European Application No. 20177252.2, dated Jul. 31, 2020, (12p).

(Continued)

*Primary Examiner* — Xi Wang
(74) *Attorney, Agent, or Firm* — Arch & Lake LLP

(57) ABSTRACT

An image shooting method, a terminal and a non-transitory computer-readable storage medium are provided. The image shooting method includes: an image shooting target corresponding to a preview photo in a preview interface is recognized; when the image shooting target includes an object associated with a shooting requirement, object shooting requirement information for the shooting requirement of the object of the image shooting target is acquired; and a photo of the object of the image shooting target is shot based on the object shooting requirement information.

9 Claims, 11 Drawing Sheets

(56) References Cited

U.S. PATENT DOCUMENTS

| | | |
|---|---|---|
| 2013/0235227 A1 | 9/2013 | Chang |
| 2014/0092292 A1 | 4/2014 | Kuznetsov |
| 2014/0204263 A1 | 7/2014 | Lee et al. |
| 2016/0028948 A1* | 1/2016 | Omori ............... H04N 5/2356 348/239 |
| 2016/0182805 A1* | 6/2016 | Emmett ............ H04N 5/23222 348/349 |
| 2017/0034409 A1 | 2/2017 | Chen et al. |
| 2019/0174056 A1 | 6/2019 | Jung et al. |
| 2019/0205686 A1* | 7/2019 | Mayer ................ G06V 10/243 |
| 2019/0208117 A1 | 7/2019 | Jung et al. |
| 2020/0177802 A1 | 6/2020 | Jung et al. |
| 2021/0034895 A1* | 2/2021 | Archibald et al. ........................ G06K 9/00906 |
| 2021/0264184 A1* | 8/2021 | Aoyagi ............. G06K 9/00906 |

FOREIGN PATENT DOCUMENTS

| | | |
|---|---|---|
| CN | 107483816 A | 12/2017 |
| CN | 108810312 A | 11/2018 |
| CN | 108989665 A | 12/2018 |
| CN | 110476405 A | 11/2019 |
| EP | 2757774 A1 | 7/2014 |
| WO | 2018184260 A1 | 10/2018 |

OTHER PUBLICATIONS

First Office Action of the European application No. 20177252.2, dated Dec. 8, 2022,(6p).
First Office Action of the Chinese Application No. 201911236108. X, dated Mar. 7, 2022 with English translation, (19p).

* cited by examiner

IMAGE SHOOTING METHOD AND DEVICE, TERMINAL, AND STORAGE MEDIUM

CROSS-REFERENCE TO RELATED APPLICATION

This application is based on and claims priority to Chinese Patent Application No. 201911236108.X filed on Dec. 5, 2019, the entire disclosure of which is hereby incorporated by reference in its entirety for all purposes.

BACKGROUND

Sometimes, when a user wants to shoot an image for an object associated with a specific shooting requirement, direct shooting may not meet a standard of the shooting requirement for the object. In order to meet the standard of the shooting requirement of the object, a terminal may be required to perform some special processing after shooting the image. For example, shooting of a credential requires processing such as regulation in a photoprinting mode.

SUMMARY

The present disclosure provides an image shooting method, a terminal and a non-transitory computer-readable storage medium.

According to a first aspect of the present disclosure, an image shooting method is provided. The method may include: recognizing an image shooting target corresponding to a preview photo in a preview interface; acquiring object shooting requirement information for a shooting requirement of an object of the image shooting target when the image shooting target comprises the object that is associated with the shooting requirement; and shooting a photo of the object of the image shooting target based on the object shooting requirement information.

According to a second aspect of the present disclosure, a terminal is provided, which may include: a processor; and a memory configured to store instructions that are executable by the processor. The processor may be configured to: recognize an image shooting target corresponding to a preview photo in a preview interface; acquire object shooting requirement information for a shooting requirement of an object of the image shooting target when the image shooting target comprises the object that is associated with the shooting requirement; and shoot a photo of the object of the image shooting target based on the object shooting requirement information.

According to a third aspect of the present disclosure, a non-transitory computer-readable storage medium having stored a computer program. The computer program, when executed by a processor, may cause the processor to perform: recognizing an image shooting target corresponding to a preview photo in a preview interface; acquiring object shooting requirement information for a shooting requirement of an object of the image shooting target when the image shooting target comprises the object that is associated with the shooting requirement; and shooting a photo of the object of the image shooting based on the object shooting requirement information.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of devices and methods.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Sometimes, in order to reach the standard of the specific image shooting requirement of the object, a terminal is required to perform some special processing after shooting the image. For example, shooting of a credential requires processing such as regulation in a photoprinting mode.

Complex and tedious operations may be required, and the requirement on familiarity with operations over the terminal is also relatively high.

Figure 1:
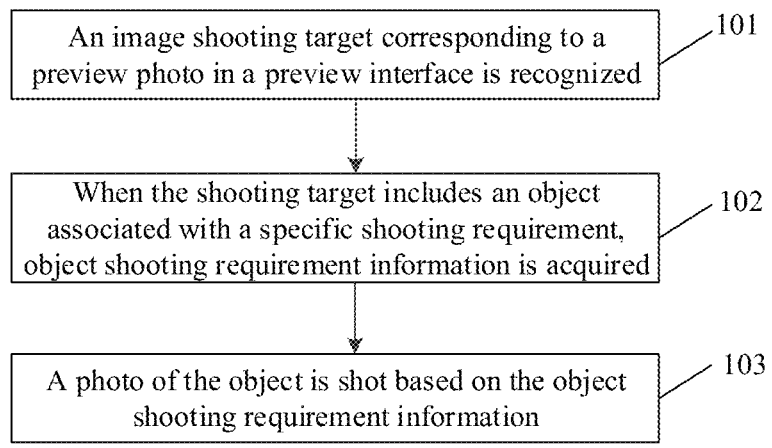
FIG. 1 is a flowchart of an image shooting method according to some examples.

The examples of the present disclosure provide an image shooting method. FIG. 1 is a flowchart of an image shooting method according to some examples. As illustrated in FIG. 1, the method mainly includes the following operations.

At block 101, an image shooting target corresponding to a preview photo in a preview interface is recognized.

The method may be applied to a terminal. The terminal may include any terminal with an image acquisition component, such as a mobile phone, a tablet computer, a notebook computer or a digital camera.

The shooting target corresponding to the preview photo in the preview interface is recognized through an image acquisition component in the terminal.

In some examples, the shooting target may be understood as any target photographed within an acquisition range of the image acquisition component.

It is to be noted that the terminal may intelligently recognize the shooting target by use of an artificial intelligence technology. For example, through a face recognition technology, whether the shooting target includes a face or not may be determined and even whether the face in the shooting target is a specified face or not may be determined. By machine learning and reasoning, whether the shooting target is a credential or not is determined and even a type of the credential, for example, an identity card or a graduation certificate, may be determined.

In some examples, the operation illustrated in block 101 may include that: analysis processing may be performed on acquisition information of the shooting object corresponding to the preview image in the preview interface according to a machine learning model such as a neural network or a vector machine to determine whether the shooting target includes an object associated with a specific shooting requirement or not.

For example, for an identity card, the identity card includes text information and a special arrangement format of the text information and/or an icon. Through optical character recognition (OCR), it is recognized that a keyword such as "residence identity card" is included, and it is determined that an arrangement format of identity information and/or an icon is a credential specification format, so that it may be determined that a present acquisition target includes a credential.

It is to be supplemented that, in some other examples, the operation illustrated in block 101 may further include that: acquisition information of the shooting target corresponding to the preview photo in the preview interface may be matched with object photo information in a locally stored library of objects associated with specific shooting requirements to determine whether the shooting target includes an object associated with the specific shooting requirement or not.

In some other examples, the operation illustrated in block 101 may further include that: the acquisition information of the shooting target corresponding to the preview photo in the preview interface is sent to a cloud server, and a result indicating whether the shooting target includes the object associated with the specific shooting requirement or not and a determined object associated with the specific shooting requirement are received from the cloud server based on an analysis result, obtained by the cloud server, of the acquisition information.

In some other examples, the shooting target may also be a shot target (i.e., a focusing target) photographed within a focusing range of the image acquisition component. Only recognizing the focusing target may reduce a recognition workload and improve recognition efficiency.

At block 102, when the shooting target includes an object associated with a specific shooting requirement, object shooting requirement information is acquired.

The object associated with the specific shooting requirement may be a credential and may also be some specific document. The credential has a shooting requirement of photoprinting and the like. The special document, for example, a confidential document, has a shooting requirement of coding some confidential information and the like. The object associated with the specific shooting requirement is not limited to the above two, and may further include objects with specific shooting requirements preset by different users for own requirements. For example, Zhang San requires that a beauty picture be adopted for shooting of a face and an original picture is adopted for shooting of other targets except the face.

The credential may include at least one of an identity card, a driver's license, a bank card, a visiting card, a passport, an exit-entry permit for traveling to and from Hong Kong and Macao, a residence permit, a residence booklet, a graduation certificate, an education certificate, a marriage certificate, a professional qualification certificate, a business license or a tax registration certificate.

The object shooting requirement information may be pre-stored in the terminal.

The object shooting requirement information includes various types of information indicating the shooting requirement of the object.

In some examples, for the credential, the object shooting requirement information may include shooting brightness of the credential, a contrast or an anti-shaking operation mode, etc. to ensure sharpness requirement of a shot photo of the credential.

The object shooting requirement information may further include angle requirement information indicating a shooting angle and the like, for example, requirement information indicating no perspective phenomenon at two ends of the photo of the shot credential.

In some other examples, the credential shooting requirement information may further include a shooting requirement during photoprinting of the credential, so that the photo of the credential shot based on the credential shooting requirement information may be directly photoprinted. The shooting requirement during photoprinting of the credential may be set in a credential photoprinting shooting mode.

Figure 2:
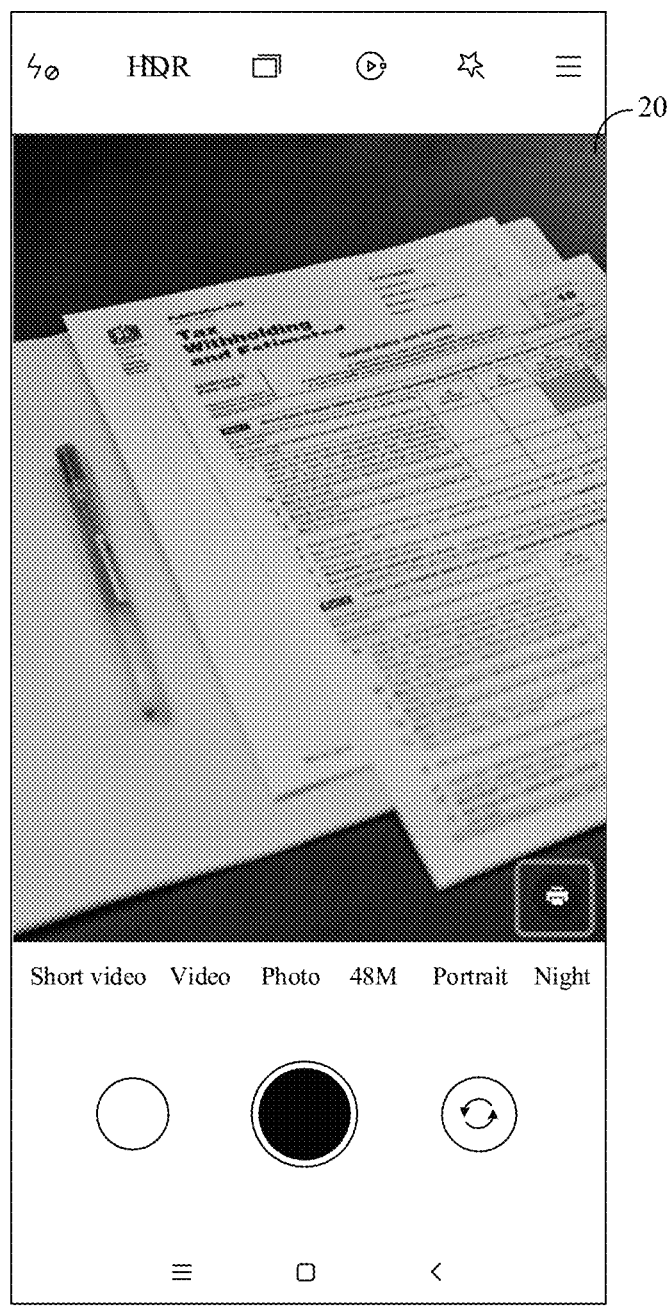
FIG. 2 is a schematic diagram illustrating a scenario of an image shooting method according to some examples.

Specifically, referring to FIG. 2, FIG. 2 is a schematic diagram illustrating a scenario of an image shooting method according to some examples. As illustrated in FIG. 2, the shooting requirement during photoprinting of the credential may be that the credential is acquired in a credential photoprinting mode.

When the shooting target of the terminal includes a credential, the credential photoprinting mode is called for shooting in the credential photoprinting mode.

In addition, for the special document, the shooting requirement of the object may include a requirement of coding a specific character string during shooting of the document to ensure confidentiality of the document, or, the shooting requirement may further include a requirement on a shooting angle of the document to ensure full-screen display of the document.

For the object, preset by the user, with the specific shooting requirement, the shooting requirement of the object may be pre-stored in the terminal such that the object shooting requirement corresponding to the object associated with the specific shooting requirement is locally acquired directly when the object, preset by the user, with the specific shooting requirement is detected.

At block 103, a photo of the object is shot based on the object shooting requirement information.

The operation illustrated in block 103 may include that: the photo of the object is shot based on the object shooting requirement information and a preset instruction. In some examples, the preset instruction includes, but not limited to, a shooting operation for a shooting control or voice control for shooting. The shooting of the photo of the object may be triggered by the preset instruction.

In some other examples, the preset instruction may further include a shooting instruction initiated when stay time of the preview photo exceeds a preset period of time. The photo of the object may be automatically shot, so that intelligence of the terminal is improved.

In the example of the present disclosure, the terminal recognizes the shooting target before shooting and, when the shooting target includes the object, shoots the object according to the shooting requirement of the object, so that not only may an operation of the user for calling an object shooting mode before the object is shot be reduced, but also a related operation of the user for processing the photo of the object after the object is shot may be reduced. Furthermore, the photo of the object associated with the specific shooting requirement may be intelligently shot, so that a requirement on use of the terminal by the user may also be reduced.

Figure 3:
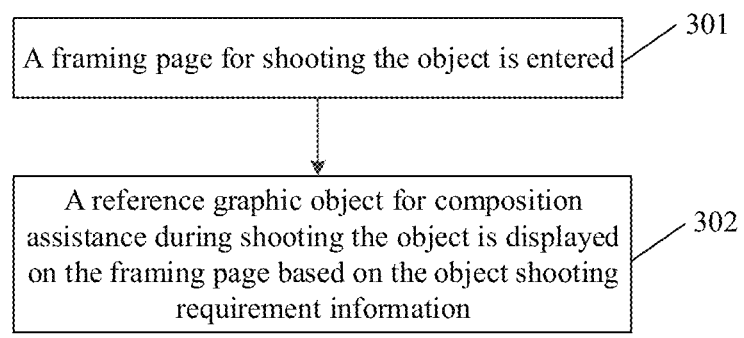
FIG. 3 is another flowchart of an image shooting method according to some examples.

In some other examples, referring to FIG. 3, FIG. 3 is another flowchart of an image shooting method according to some examples. The method further includes the following operations.

At block 301, a framing page for shooting the object is entered.

At block 302, a reference graphic object for composition assistance during shooting the object is displayed on the framing page based on the object shooting requirement information.

It can be understood that the reference graphic object for composition assistance during shooting the object may include an auxiliary line with the same contour as the object such that the user may focus on the credential for shooting based on the auxiliary line.

In some examples, the reference graphic object includes at least one of: an outer contour auxiliary line of the object, or an auxiliary line for predetermined information in the object. The outer contour auxiliary line is matched with an outer contour edge of the object.

The auxiliary line for predetermined information in the object may include at least one of: an auxiliary line of a portrait in the credential, an auxiliary line of an important icon in the credential, or an auxiliary line of identification information (for example, an identity number) in the credential. The auxiliary line for the predetermined information may include an outer contour auxiliary line of the predetermined information and an inner contour auxiliary line of an inner structure of the predetermined information.

For example, the object is a credential. If a shape of the credential is a square, and the outer contour auxiliary line of the credential may include graphics formed by four right-angled broken lines to present four vertex angles of the square credential or graphics formed by four crosses to present the four vertex angles of the square credential. The auxiliary line of the predetermined information in the credential may include outer contour auxiliary lines or inner contour auxiliary lines of the inner structure corresponding to the predetermined information in different pages to be shot of the credential, for example, a face contour line on the front of a 2nd-generation identity card or a national emblem contour line on the back of the 2nd-generation identity card.

In some other examples, the auxiliary line for the predetermined information in the object may further include a central point figure used for aligning a center of the credential, for example, a point figure or a central point cross, and the like.

Accordingly, in the example, the reference graphic object for composition assistance during shooting the object is displayed on the framing page, so that regularity of the shot photo of the object is ensured, and subsequent processing accuracy and processing efficiency of the photo of the object are improved.

Figure 4:
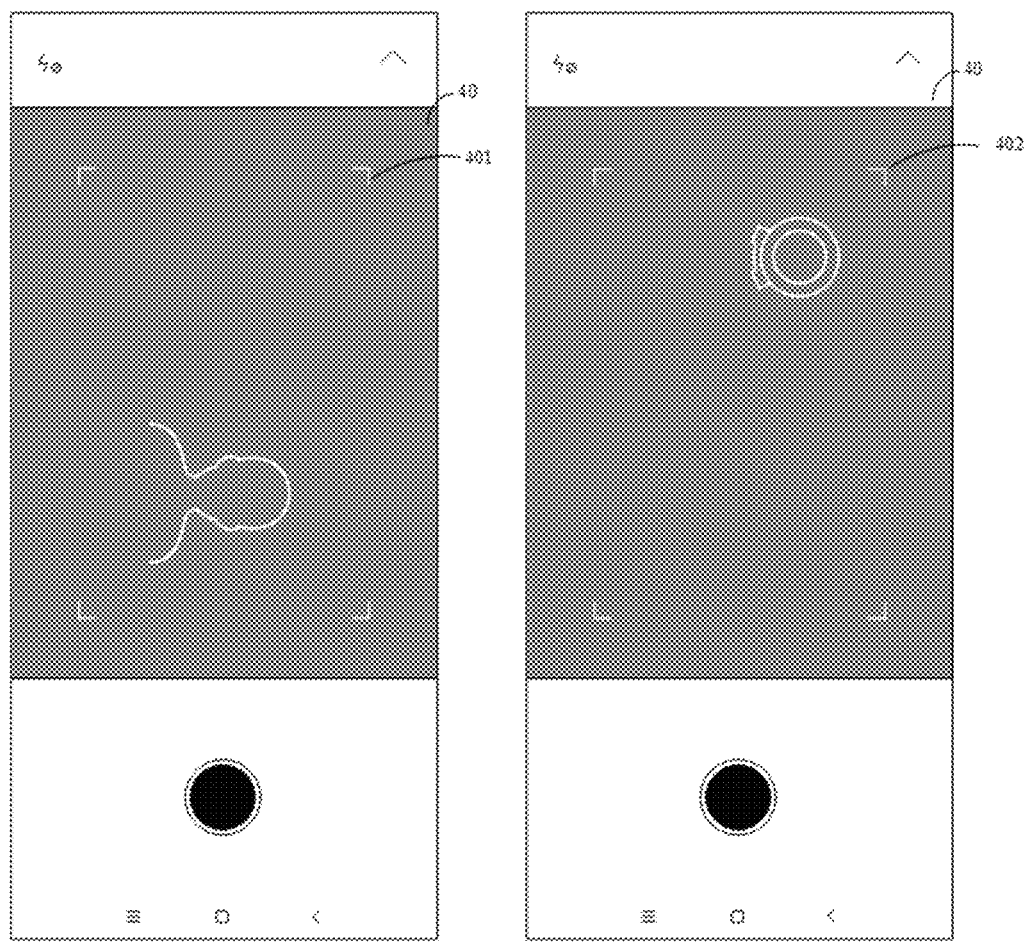
FIG. 4 is another schematic diagram illustrating a scenario of an image shooting method according to some examples.

For example, referring to FIG. 4, FIG. 4 is another schematic diagram illustrating a scenario of an image shooting method according to some examples. As illustrated in FIG. 4, for example, the object is a 2nd-generation identity card, and reference graphics for composition assistance during shooting the credential is displayed on the framing page 40. The reference graphics for composition assistance during shooting the credential is an auxiliary line consistent with a contour of the 2nd-generation identity card, which can be used for assisting the user in shooting of the 2nd-generation identity card.

In some examples, the object associated with the specific shooting requirement includes a credential. If the shooting requirement of the credential is to shoot the credential that may be photoprinted, the operation of entering the framing page for shooting the object may include that: the framing page corresponding to the credential photoprinting mode is automatically entered from the preview interface.

In the example, the terminal, when the shooting target includes the credential, may intelligently enter the framing page for shooting the credential, so that a selection operation and the like of the user for a shooting mode such as credential shooting may be reduced, and the user experience is improved.

In some other examples, the operation of entering the framing page for shooting the object may further include that: a framing page corresponding to a credential photoprinting mode is entered in response to receiving a confirmation operation for prompt information.

The prompt information may be output to the preview interface when the shooting target includes the credential.

The terminal, when determining that the object associated with the specific shooting requirement in the shooting target is the credential, may output the prompt information on the preview interface, the prompt information being used for prompting the user whether to adjust the shooting mode to the credential photoprinting mode or not, and enter the framing page corresponding to the credential photoprinting mode based on the confirmation operation for the prompt information.

In the example, based on the confirmation operation of the user, a display page of the terminal may be switched from the preview interface to the framing page for shooting the credential, so that a misoperation of entering the framing page for shooting the credential in case of a recognition error of the terminal may be reduced on one hand; and on the other hand, the user may select not to enter the framing page corresponding to the credential photoprinting mode based on the prompt information when shooting in the credential photoprinting mode is not required, so that the user experience is improved.

Furthermore, the method further includes that:

an object type of the object in the shooting target is recognized; and credential shooting requirement information corresponding to the object type is acquired according to the object type, different object types corresponding to different pieces of object shooting requirement information.

For example, for a 2nd-generation identity card, a shooting requirement for the 2nd-generation identity card may include at least one of: both the front and back of the 2nd-generation identity card are shot; or, a sharpness value of an image and number on the front of the 2nd-generation identity card is greater than a first predetermined value.

For another example, for a residence booklet, a shooting requirement for the residence booklet includes at least one of: both an index page and individual page of the residence booklet are shot; or, a sharpness value of a text corresponding to address information of the shot residence booklet is greater than a second predetermined value.

The terminal may further recognize the object type of the object in the shooting target.

It can be understood that different object types correspond to different pieces of object shooting requirement information, so that the terminal recognizes the object type of the object in the shooting target to acquire the object shooting requirement information corresponding to the object type. Therefore, an operation of selecting different pieces of object shooting information based on different object types by the user may be reduced, and the intelligence of the terminal is further improved.

For example, the terminal, when recognizing that a credential type of the credential in the shooting target is an identity card, may automatically acquire credential shooting requirement information corresponding to the identity card. Shooting of the identity card usually requires shooting of the front and back of the identity card and sharpness of a face image on the identity card and the like. The different pieces of credential shooting requirement information corresponding to the different credential types may be preset in the terminal, and the credential shooting requirement information corresponding to the credential type may also be acquired from the cloud server.

In some other examples, if the object shooting requirement information indicates that the object has N different pages to be shot, N being a positive integer greater than or equal to 2, the operation of displaying the reference graphic object for composition assistance during shooting the object on the framing page based on the object shooting requirement information includes that:

Reference graphic objects, corresponding to the N different pages to be shot of the object, for composition assistance during shooting are displayed on N framing pages respectively based on the object shooting requirement information.

It is to be noted that different object types correspond to different numbers of pages to be shot. Since page contents of different pages to be shot are different, different pages to be shot require different reference graphic objects for composition assistance.

In the example, the reference graphic objects, corresponding to the N different pages to be shot of the object, for composition assistance during shooting are displayed on the N framing pages respectively for adaptation to shooting of the different pages to be shot of the object.

Referring to FIG. 4 again, as illustrated in FIG. 4, for example, the object is still a credential, and the credential is a 2nd-generation identity card. The credential shooting requirement information of the 2nd-generation identity card indicates two different pages to be shot, specifically the front of the 2nd-generation identity card and the back of the 2nd-generation identity card.

According to the shooting requirement of the 2nd-generation identity card, a first reference graphic object 401, corresponding to the front of the 2nd-generation identity card, for composition assistance during shooting the residential is displayed on the first framing page 40. And a second reference graphic object 402, corresponding to the back of the 2nd-generation identity card, for composition assistance during shooting the credential is displayed on the second framing page 40.

In the example, the first reference graphic object 401 not only includes an auxiliary line consistent with a contour of the 2nd-generation identity card but also includes an auxiliary line of a face image on the front of the 2nd-generation identity card, so that the user may focus on, according to the first reference graphic object 401, the front of the 2nd-generation identity card for shooting. The second reference graphic object 402 not only includes the auxiliary line consistent with the contour of the 2nd-generation identity card but also includes an auxiliary line of the national emblem on the back of the 2nd-generation identity card, so that the user may focus on, according to the second reference graphic object 402, the back of the 2nd-generation identity card for shooting.

It is to be supplemented that, if only one framing page may be displayed on the display page of the terminal, the method further includes that:

based on a received shooting operation for a shooting control, the $(n-1)^{th}$ page to be shot corresponding to the credential is shot on the $(n-1)^{th}$ framing page, and switching to the $n^{th}$ framing page is performed; and the reference graphic object, corresponding to the $n^{th}$ page to be shot of the credential, for composition assistance during shooting is displayed on the $n^{th}$ framing page, n being a positive integer less than or equal to N and greater than or equal to 2.

In the example, the terminal, after completely acquiring a page to be shot of the credential, may automatically turn to the next page to be shot of the credential and, when all the pages to be shot are shot, exit from the framing page, so that the intelligence of the terminal is improved, and user operations are reduced.

In some examples, when a page is acquired, if a photo acquired based on an acquisition determination operation of the user does not meet the shooting requirement defined by the shooting requirement information, the terminal may discard the photo that does not meet the shooting requirement and continue staying on the present framing page until a photo meeting the shooting requirement is acquired.

In another example, the method further includes that:

the photo of the object is corrected to obtain a corrected photo; and the corrected photo of a first size is added into a page view of a predetermined size to generate a target picture. A size of an image, obtained by photoprinting the corrected photo of the first size, of the object is in a preset ratio to an actual size of the object.

The operation of correcting the photo of the object includes at least one of the following operations:

the photo of the object is scaled up;

the photo of the object is scaled down;

the photo of the object is clipped;

perspective distortion is performed on the photo of the object;

text enhancement is performed on the photo of the object; or a display parameter of the photo of the object is regulated.

The display parameter may include at least one of: a contrast, brightness, a color space, or a gamma value.

The predetermined size may be a size corresponding to photoprinting paper of a printer connected with the terminal.

The preset ratio is a ratio determined based on the object shooting requirement information. For example, the preset ratio may be 1:1. For another example, the preset proportion may also be any value less than 1 or any value greater than 1.

For example, the object is still a credential, the credential is a 2nd-generation identity card, and the preset ratio may be 1:1. That is, a size of an image, obtained by photoprinting, of the 2nd-generation identity card is the same as an actual size of the 2nd-generation identity card.

For another example, under some conditions, the credential is a business license of which an actual size is greater than the size of the photoprinting paper, and in such case, for ensuring that all contents of the business license may be photoprinted on the photoprinting paper, the preset ratio may be set to be a value less than 1, so that the business license may be scaled down and photoprinted on the photoprinting paper.

In the example, the photo of the object is corrected to generate a corrected photo of the first size, and the corrected photo of the first size is added into the page view of the predetermined size to generate the target picture. The size of the image, obtained by photoprinting the corrected photo of the first size, of the object is in a preset ratio to the actual size of the credential, so that photoprinting requirements of different credentials may be directly met, the photo may be directly photoprinted, user operations are reduced, and the user experience is improved.

Furthermore, in some examples, the method further includes at least one of the following operations:

an editable control is generated on a display page corresponding to the target picture, and edit information is input based on an input operation for the editable control;

a sharing control is generated on the display page corresponding to the target picture, and the target picture is shared based on an input operation for the sharing control;

a recognition control is generated on the display page corresponding to the target picture, and the text information of the target picture is recognized based on an input operation for the recognition control; and a document generation control is generated on the display page corresponding to the target picture, and a corresponding document is generated from the target picture based on an input operation for the document generation control.

The editable control may include an editable text box. For example, the target picture is a picture generated from a photo of a 2nd-generation identity card, and an editable text box may be generated at a position of the photo of the 2nd-generation identity card. The editable text box may be configured for the user to input a text to be edited, for example, "only for renting" and "only for international logistics", to prevent an illegal person from illegally using the picture generated from the photo of the 2nd-generation identity card.

The sharing control may include a sharing operation button. The sharing operation button may be linked to various sharing platforms such as WeChat, Microblog, short message or mailbox, so that the user may send the generated target picture to another device through the sharing operation button, which is favorable for telecommuting or paperless office.

The recognition control may be configured to recognize the text information from the target picture, for example, recognizing the text information from the target picture through optical character recognition (OCR), so that the terminal can extract the recognized text information, and then perform subsequent translation processing or convert the recognized text information into voice information, etc. Therefore, readability of the target picture may be improved.

The document generation control includes a portable document format (PDF) generation control, a Word generation control or a TXT generation control, etc. so that a corresponding document may be generated from the target picture for convenient storage and management.

Furthermore, the present disclosure also provides an example to further understand the shooting method provided in the examples of the present disclosure.

In the example, the terminal is, for example, a mobile phone, and the object associated with the specific shooting requirement is, for example, a credential.

Figure 5:
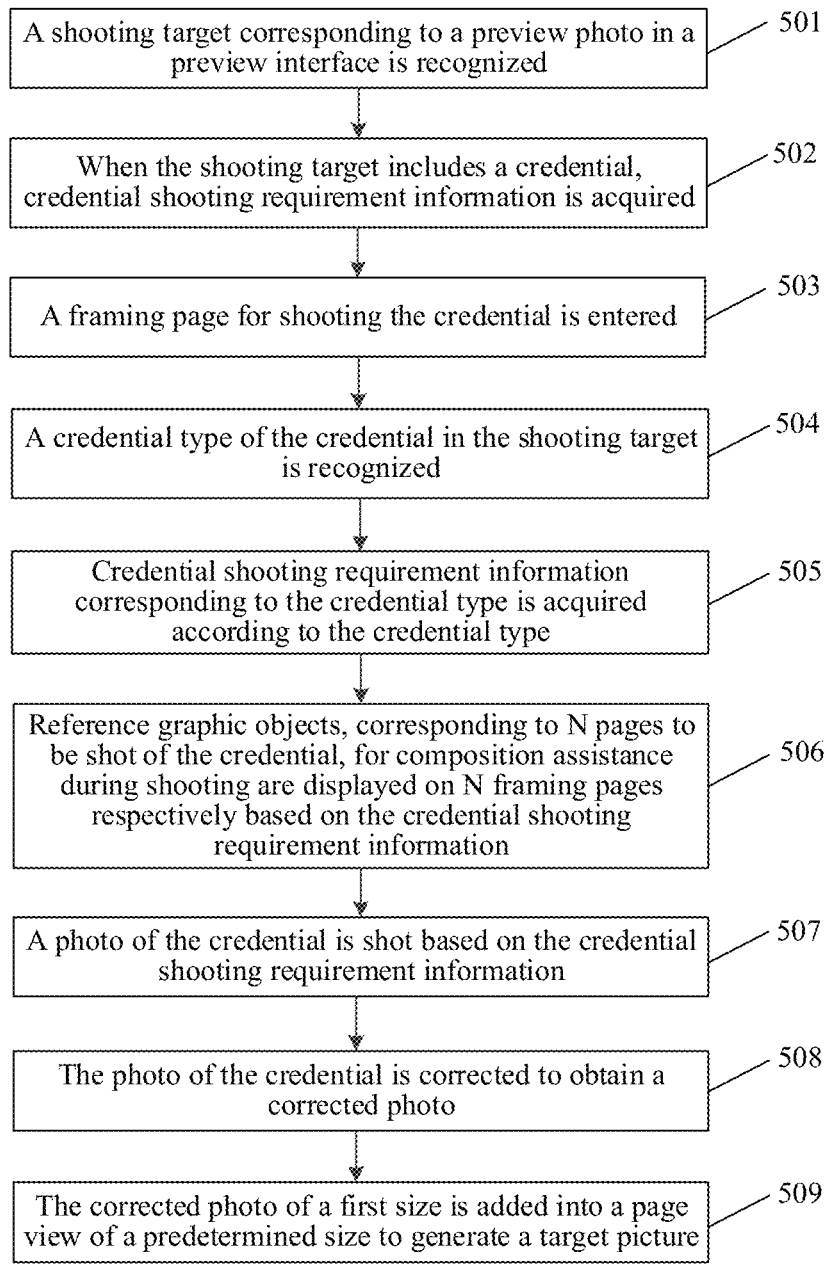
FIG. 5 is another flowchart of an image shooting method according to some examples.

Referring to FIG. 5, FIG. 5 is another flowchart of an image shooting method according to some examples. As illustrated in FIG. 5, the method includes the following operations.

At block 501, a shooting target corresponding to a preview photo in a preview interface is recognized.

Referring to FIG. 2 again, as illustrated in FIG. 2, the shooting target may be displayed in the preview interface 20.

At block 502, when the shooting target includes a credential, credential shooting requirement information is acquired.

When the shooting target in the preview interface 20 includes the credential, the credential shooting requirement information may be automatically acquired. The shooting requirement information instructs the terminal to be switched to a credential photoprinting mode corresponding to credential shooting.

At block 503, a framing page for shooting the credential is entered.

The mobile phone entering the framing page for shooting may include that, under the condition that an intelligent camera function in the mobile phone is turned on, when it is recognized that the shooting target includes the credential, the photoprinting mode may be directly entered for shooting. That the mobile phone enters the framing page for shooting may further include that, when the mobile phone recognizes the shooting target includes the credential, prompt information may be popped up to prompt a user whether to enter the photoprinting mode or not.

At block 504, a credential type of the credential in the shooting target is recognized.

The recognized credential type is a 2nd-generation identity card.

At block 505, credential shooting requirement information corresponding to the credential type is acquired according to the credential type.

Shooting requirement information of the 2nd-generation identity card indicates that both the front and back of the 2nd-generation identity card are required to be shot.

At block 506, reference graphic objects, corresponding to N pages to be shot of the credential, for composition assistance during shooting are displayed on N framing pages respectively based on the credential shooting requirement information.

Referring to FIG. 4 again, as illustrated in FIG. 4, a first reference graphic object 401, corresponding to the front to be shot of the 2nd-generation identity card, for composition assistance during shooting is displayed on the first framing page 40. And a second reference graphic object 402, corresponding to the back to be shot of the 2nd-generation identity card, for composition assistance during shooting is displayed on the second framing page 40. The reference graphic objects, adapted to different pages to be shot of the credential, for composition assistance are structured in different framing pages, so that the user may be helped to focus on the credential for shooting, regularity of a shot photo of the credential is favorably ensured, subsequent processing of the photo is facilitated, and processing efficiency of the photo is improved.

In some other examples, for example, shooting of a residence booklet, a reference graphic object corresponding to the page to be shot of the credential and assisting in composition for shooting is displayed on the framing page based on credential shooting requirement information corresponding to the residence booklet. For example, an index page and individual page of the residence booklet are required to be shot.

At block 507, a photo of the credential is shot based on the credential shooting requirement information.

At block 508, the photo of the credential is corrected to obtain a corrected photo.

After a photo of each page to be shot is shot, the photo of the credential may be automatically corrected. Specific correction processing includes scaling-up, scaling-down, clipping, perspective distortion, text enhancement, display parameter regulation and the like over the photo of the credential through algorithms.

At block 509, the corrected photo of a first size is added into a page view of a predetermined size to generate a target picture.

Figure 6:
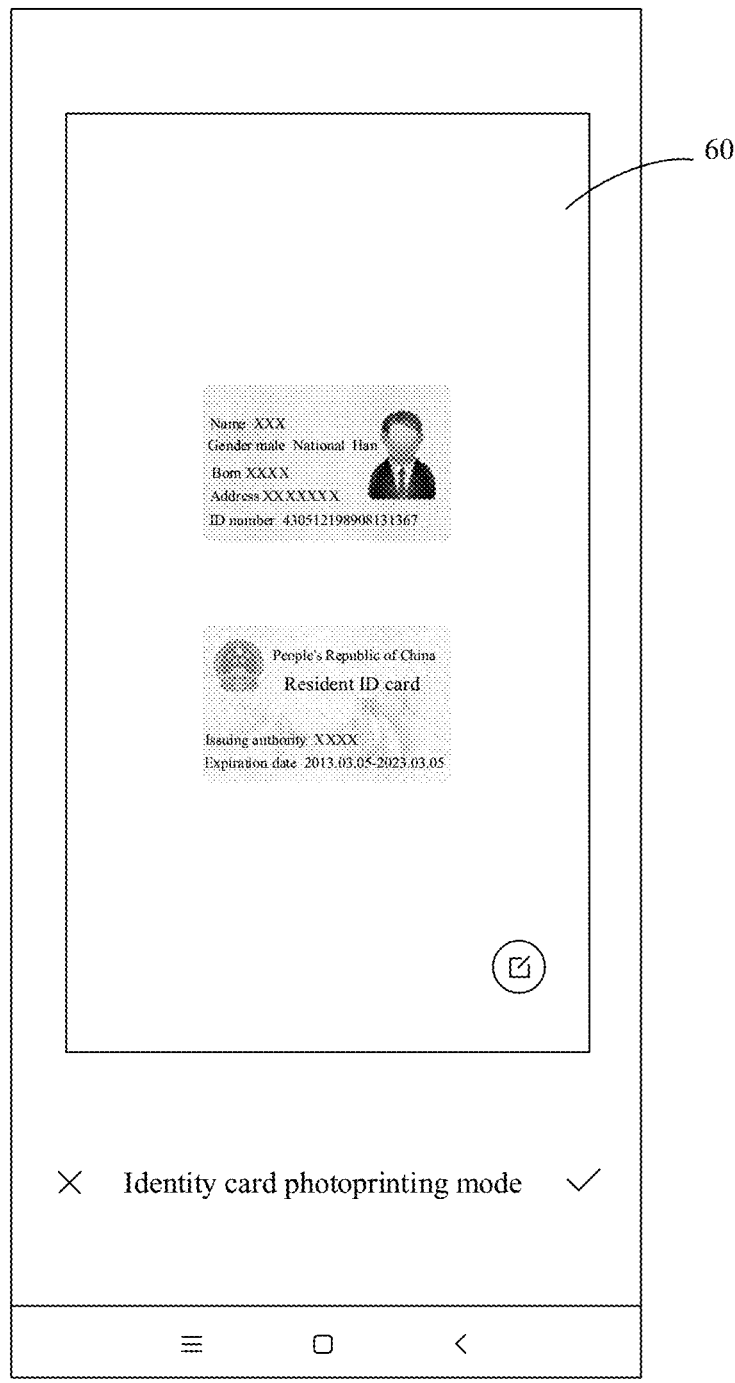
FIG. 6 is yet another schematic diagram illustrating a scenario of an image shooting method according to some examples.

Referring to FIG. 6, FIG. 6 is yet another schematic diagram illustrating a scenario of an image shooting method according to some examples. As illustrated in FIG. 6, a front photo and back photo, of the first size, of the 2nd-generation identity card are added together into the page view 60 of the predetermined size.

It is to be noted that sizes of images, obtained by photoprinting based on the first size, of the front and back of the 2nd-generation identity card are the same as an actual size of the 2nd-generation identity card.

Furthermore, the terminal may further input edit information for the target picture based on an input operation for an editable control, or share the target picture based on an input operation for a sharing control, or recognize text information from the target picture based on an input operation for a recognition control, or generate a corresponding document, for example, a PDF document, from the target picture based on an input operation for a document generation control.

In the example, functions of copying and like are realized through photos in the mobile phone in present paperless office and telecommuting. According to the example, a required photoprint of the credential may be produced anytime for digital storage, and operation cost, storage cost and logistics cost are reduced. The photo is acquired through a camera of the mobile phone and stored in the mobile phone, a post processing and regulation space is large, application to more scenarios is facilitated, and the photo, once being shot and stored for later use, may be quickly and conveniently used for many times, so that consumption channels of the camera of the mobile phone for images are extended, and the user experience of the mobile phone is improved.

Figure 7:
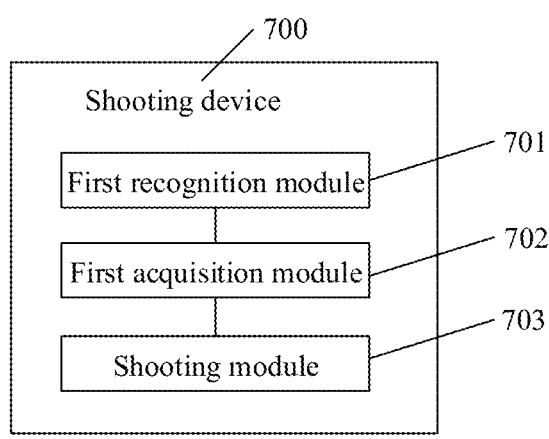
FIG. 7 is a block diagram of an image shooting device according to some examples.

FIG. 7 is a block diagram of an image shooting device according to some examples. Referring to FIG. 7, the shooting device 700 includes a first recognition module 701, a first acquisition module 702 and a shooting module 703.

The first recognition module 701 is configured to recognize a shooting target corresponding to a preview image in a preview interface.

The first acquisition module 702 is configured to, when the shooting target includes a credential, acquire credential shooting requirement information.

The shooting module 703 is configured to shoot a photo of the credential based on the credential shooting requirement information.

Figure 8:
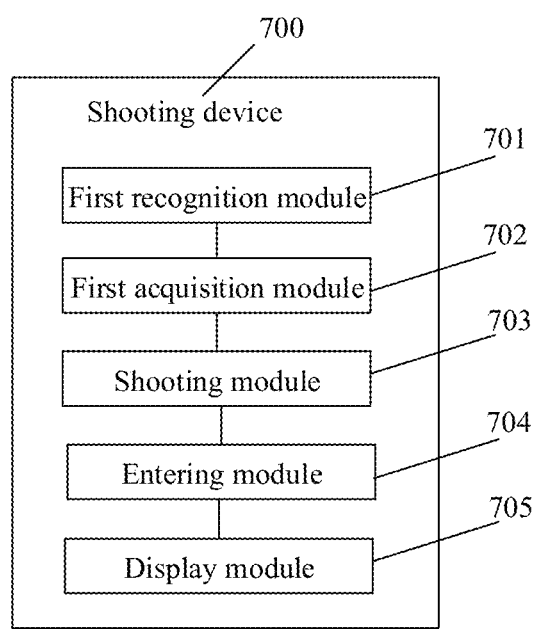
FIG. 8 is a block diagram of another image shooting device according to some examples.

In an optional example, referring to FIG. 8, FIG. 8 is a block diagram of another image shooting device according to some examples. As illustrated in FIG. 8, the shooting device 700 further includes:

an entering module 704, configured to enter a framing page for shooting the credential; and a display module 705, configured to display a reference graphic object for composition assistance during shooting the credential on the framing page based on the credential shooting requirement information.

In an optional example, referring to FIG. 8 again, the entering module 704 is further configured to:

enter a framing page corresponding to a credential photoprinting mode in response to receiving a confirmation operation for prompt information, wherein the prompt information is output to the preview interface when the shooting target includes the credential, or, automatically enter the framing page corresponding to the credential photoprinting mode from the preview interface.

Figure 9:
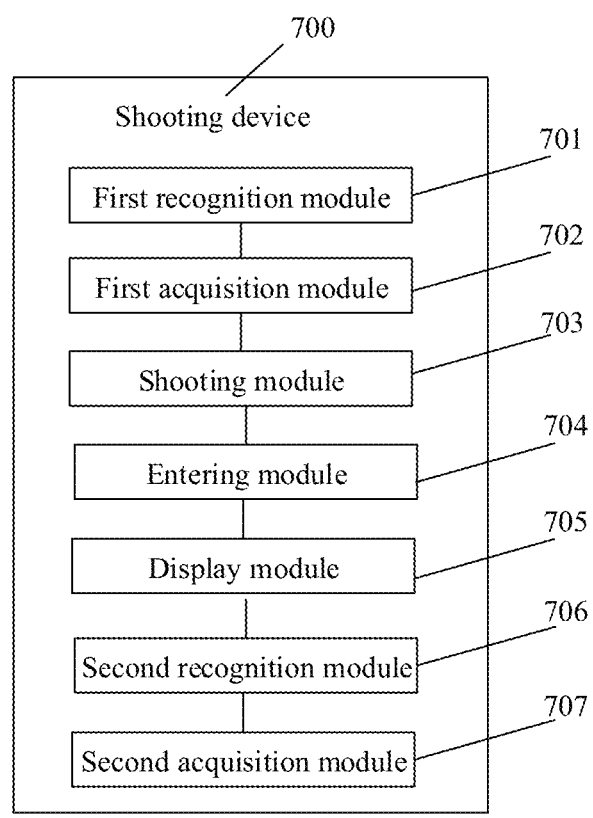
FIG. 9 is a block diagram of yet another image shooting device according to some examples.

In an optional example, referring to FIG. 9, FIG. 9 is a block diagram of another image shooting device according to some examples. As illustrated in FIG. 9, the shooting device 700 further includes:

a second recognition module 706, configured to recognize a credential type of the credential in the shooting target; and a second acquisition module 707, configured to acquire credential shooting requirement information corresponding to the credential type, different credential types corresponding to different pieces of credential shooting requirement information.

In an optional example, if the credential shooting requirement information indicates that the credential has N different pages to be shot, N being a positive integer greater than or equal to 2, the display module 705 is further configured to:

display reference graphic objects, corresponding to the N different pages to be shot of the credential, for composition assistance during shooting on N framing pages respectively according to the credential shooting requirement information.

Figure 10:
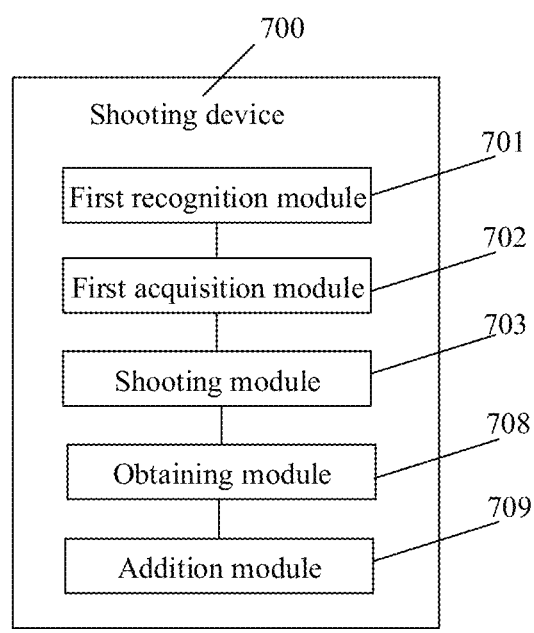
FIG. 10 is a block diagram of still another image shooting device according to some examples.

In an optional example, referring to FIG. 10, FIG. 10 is a block diagram of another image shooting device according to some examples. The shooting device further includes:

an obtaining module 708, configured to correct the photo of the credential to obtain a corrected photo; and an addition module 709, configured to add the corrected photo of a first size into a page view of a predetermined size to generate a target picture, wherein a size of an image, obtained by photoprinting the corrected photo of the first size, of the credential being in a predetermined ratio to an actual size of the credential.

With respect to the device in the above example, the specific manners for performing operations for individual modules therein have been described in detail in the example regarding the method, which will not be elaborated herein.

Figure 11:
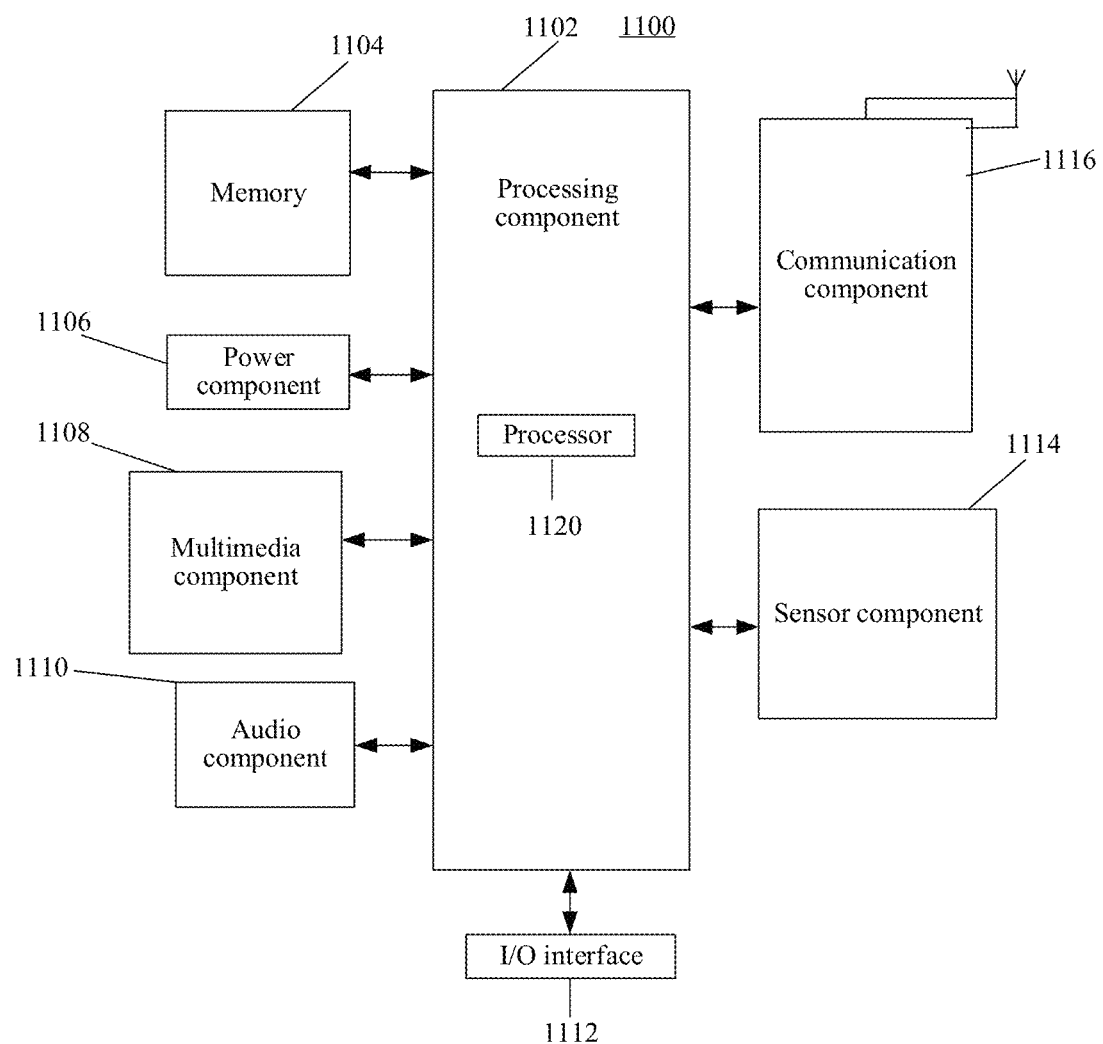
FIG. 11 is a block diagram of a terminal according to some examples.

FIG. 11 is a block diagram of a terminal 1100 for image shooting according to some examples. For example, the terminal 1100 may be a mobile phone, a computer, a digital broadcast terminal, a messaging device, a gaming console, a tablet, a medical device, exercise equipment, a personal digital assistant and the like.

Referring to FIG. 10, the terminal 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the terminal 1100, such as the operations associated with display, telephone calls, data communications, camera operations, and recording operations. The processing component 1102 may include one or more processors 1120 to execute instructions to perform all or part of the operations in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the terminal 1100. Examples of such data include instructions for any application programs or methods operated on the terminal 1100, contact data, phonebook data, messages, pictures, video, etc. The memory 1104 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1104 provides power for various components of the terminal 1100. The power component 1104 may include a power management system, one or more power supplies, and other components associated with generation, management and distribution of power for the terminal 1100.

The multimedia component 1108 includes a screen providing an output interface between the terminal 1100 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 1108 includes a front camera and/or a rear camera. The front camera and/or the rear camera may receive external multimedia data when the terminal 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a microphone (MIC), and the MIC is configured to receive an external audio signal when the terminal 1100 is in the operation mode, such as a call mode, a recording mode and a voice recognition mode. The received audio signal may further be stored in the memory 1104 or sent through the communication component 1116. In some examples, the audio component 1110 further includes a speaker configured to output the audio signal.

The I/O interface 1112 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the terminal 1100. For instance, the sensor component 1114 may detect an on/off status of the terminal 1100 and relative positioning of components, such as a display and small keyboard of the terminal 1100, and the sensor component 1114 may further detect a change in a position of the terminal 1100 or a component of the terminal 1100, presence or absence of contact between the user and the terminal 1100, orientation or acceleration/deceleration of the terminal 1100 and a change in temperature of the terminal 1100. The sensor component 1114 may include a proximity sensor configured to detect presence of an object nearby without any physical contact. The sensor component 1114 may also include a light sensor, such as a complementary metal oxide semiconductor (CMOS) or charge coupled device (CCD) image sensor, configured for use in an imaging application. In some examples, the sensor component 714 may also include an acceleration sensor, a gyroscope sensor, a magnetic sensor, a pressure sensor or a temperature sensor.

The communication component 1116 is configured to facilitate wired or wireless communication between the terminal 1100 and another device. The terminal 1100 may access a communication-standard-based wireless network, such as a wireless fidelity (WiFi) network, a 2 ng-generation (2G) or 3rd-generation (3G) network or a combination thereof. In some examples, the communication component 1116 receives a broadcast signal or broadcast associated information from an external broadcast management system through a broadcast channel. In some examples, the communication component 1116 further includes a near field communication (NFC) module to facilitate short-range communication. For example, the NFC module may be implemented based on radio frequency identification (RFID) technology, an infrared data association (IrDA) technology, an ultra-wide band (UWB) technology, a bluetooth (BT) technology and another technology.

In some examples, the terminal 1100 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In some examples, there is also provided a non-transitory computer-readable storage medium including an instruction, such as the memory 1104 including an instruction, and the instruction may be executed by the processor 1120 of the terminal 1100 to implement the abovementioned method. For example, the non-transitory computer-readable storage medium may be a ROM, a random access memory (RAM), a compact disc read-only memory (CD-ROM), a magnetic tape, a floppy disc, an optical data storage device and the like.

According to a non-transitory computer-readable storage medium, an instruction in the storage medium is executed by a processor of a terminal to enable the terminal to execute the shooting method of each abovementioned example.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof

What is claimed is:

1. An image shooting method, performed by a terminal, comprising:
   recognizing an image shooting target corresponding to a preview photo in a preview interface;
   acquiring first credential shooting requirement information for a shooting requirement of a credential of the image shooting target and outputting prompt information on the preview interface, in response to the image shooting target comprising the credential that is associated with the shooting requirement wherein the first credential shooting requirement information instructs the terminal to be switched to a credential photoprinting mode corresponding to credential shooting, the first credential shooting requirement information comprises a shooting requirement during photoprinting of the credential and the prompt information is used for prompting a user whether to adjust a shooting mode to the credential photoprinting mode or not;
   entering a framing page in the credential photoprinting mode from the preview interface, in response to receiving a confirmation operation for the prompt information;
   displaying, based on the first credential shooting requirement information, a reference graphic object for composition assistance while shooting the credential on the framing page, wherein the reference graphic object comprises an outer contour auxiliary line of the credential and an auxiliary line for predetermined information in the credential, the outer contour auxiliary line is matched with an outer contour edge of the credential and the auxiliary line for the predetermined information comprises an outer contour auxiliary line of the predetermined information and an inner contour auxiliary line of an inner structure of the predetermined information; and
   shooting a photo of the credential.

2. The image shooting method of claim 1, further comprising:
   correcting the photo of the credential to obtain a corrected photo of a first size; and
   adding the corrected photo of the first size into a page view of a predetermined size to generate a target picture, wherein a size of an image, obtained by photoprinting the corrected photo of the first size, of the credential is in a predetermined ratio to an actual size of the credential.

3. The image shooting method of claim 1, further comprising:
   recognizing a credential type of the credential in the image shooting target;
   acquiring second credential shooting requirement information corresponding to the credential type, wherein different credential types correspond to different second credential shooting requirement information, the second credential shooting requirement information indicates that the credential has N different pages to be shot, and N is a positive integer that is greater than or equal to 2 and N is determined based on the credential type; and
   displaying, based on the second credential shooting requirement information, N different reference graphic objects, corresponding to the N different pages to be shot of the credential, for composition assistance while shooting the credential object on N framing pages; and
   wherein shooting the photo of the credential comprises:
   shooting the photo of the credential based on the second credential shooting requirement information.

4. A terminal, comprising:
   a processor; and
   a memory configured to store instructions that are executable by the processor,
   wherein the processor is configured to:
   recognize an image shooting target corresponding to a preview photo in a preview interface;
   acquire first credential shooting requirement information for a shooting requirement of a credential of the image shooting target and output prompt information on the preview interface, in response to the image shooting target comprising the credential that is associated with the shooting requirement, wherein the first credential shooting requirement information instructs the terminal to be switched to a credential photoprinting mode corresponding to credential shooting, the first credential shooting requirement information comprises a shooting requirement during photoprinting of the credential and the prompt information is used for prompting a user whether to adjust a shooting mode to the credential photoprinting mode or not;

enter a framing page in the credential photoprinting mode from the preview interface, in response to receiving a confirmation operation for the prompt information;

display, based on the first credential shooting requirement information, a reference graphic object for composition assistance while shooting the credential on the framing page, wherein the reference graphic object comprises an outer contour auxiliary line of the credential and an auxiliary line for predetermined information in the credential, the outer contour auxiliary line is matched with an outer contour edge of the credential and the auxiliary line for the predetermined information comprises an outer contour auxiliary line of the predetermined information and an inner contour auxiliary line of an inner structure of the predetermined information; and shoot a photo of the credential.

5. The terminal of claim 4, wherein the processor is further configured to:

correct the photo of the credential to obtain a corrected photo of a first size; and add the corrected photo of the first size into a page view of a predetermined size to generate a target picture, wherein a size of an image, obtained by photoprinting the corrected photo of the first size, of the credential is in a predetermined ratio to an actual size of the credential.

6. The terminal of claim 4, wherein the processor is further configured to:

recognize a credential type of the credential in the image shooting target;

acquiring second credential shooting requirement information corresponding to the credential type, wherein different credential types correspond to different second credential shooting requirement information, the second credential shooting requirement information indicates that the credential has N different pages to be shot, and N is a positive integer that is greater than or equal to 2 and N is determined based on the credential type;

displaying, based on the second credential shooting requirement information, N different reference graphic objects, corresponding to the N different pages to be shot of the credential, for composition assistance while shooting the credential object on N framing pages; and shooting the photo of the credential based on the second credential shooting requirement information.

7. A non-transitory computer-readable storage medium having stored therein a computer program that, when executed by a processor of a terminal, causes the processor to perform:

recognizing an image shooting target corresponding to a preview photo in a preview interface; acquiring first credential shooting requirement information for a shooting requirement of a credential of the image shooting target and outputting prompt information on the preview interface, in response to the image shooting target comprising the credential that is associated with the shooting requirement, wherein the first credential shooting requirement information instructs the terminal to be switched to a credential photoprinting mode corresponding to credential shooting, the first credential shooting requirement information comprises a shooting requirement during photoprinting of the credential and the prompt information is used for prompting a user whether to adjust a shooting mode to the credential photoprinting mode or not;

entering a framing page in the credential photoprinting mode from the preview interface, in response to receiving a confirmation operation for the prompt information;

displaying, based on the first credential shooting requirement information, a reference graphic object for composition assistance while shooting the credential on the framing page, wherein the reference graphic object comprises an outer contour auxiliary line of the credential and an auxiliary line for predetermined information in the credential, the outer contour auxiliary line is matched with an outer contour edge of the credential and the auxiliary line for the predetermined information comprises an outer contour auxiliary line of the predetermined information and an inner contour auxiliary line of an inner structure of the predetermined information; and shooting a photo of the credential.

8. The non-transitory computer-readable storage medium of claim 7, wherein the computer program further causes the processor to perform:

correcting the photo of the credential to obtain a corrected photo of a first size; and adding the corrected photo into a page view of a predetermined size to generate a target picture, wherein a size of an image, obtained by photoprinting the corrected photo of the first size, of the credential is in a predetermined ratio to an actual size of the credential.

9. The non-transitory computer-readable storage medium of claim 7, wherein the computer program further causes the processor to perform:

recognizing a credential type of the credential in the image shooting target;

acquiring second credential shooting requirement information corresponding to the credential type, wherein different credential types correspond to different second credential shooting requirement information, the second credential shooting requirement information indicates that the credential has N different pages to be shot, and N is a positive integer that is greater than or equal to 2 and N is determined based on the credential type;

displaying, based on the second credential shooting requirement information, N different reference graphic objects, corresponding to the N different pages to be shot of the credential, for composition assistance while shooting the credential object on N framing pages; and shooting the photo of the credential based on the second credential shooting requirement information.

* * * * *